United States Patent [19]

Evans et al.

[11] 4,280,053

[45] Jul. 21, 1981

[54] TECHNETIUM-99M GENERATORS

[75] Inventors: John V. Evans, Lilli Pilli; Ralph W. Matthews, Georges Hall, both of Australia

[73] Assignee: Australian Atomic Energy Commission, Australia

[21] Appl. No.: 912,146

[22] Filed: Jun. 2, 1978

[30] Foreign Application Priority Data

Jun. 10, 1977 [AU] Australia ............................ PD0412

[51] Int. Cl.$^3$ ........................ G21G 1/04; C01G 57/00

[52] U.S. Cl. ...................... 250/432 PD; 252/301.1 R; 422/159; 423/2; 423/249

[58] Field of Search ..................... 252/301.1 R; 423/2, 423/249, 55, 56, 58, 626; 424/1.5, 1; 422/159; 250/432 PD

[56] References Cited

U.S. PATENT DOCUMENTS 3,785,990 1/1974 Benjamins et al. .......... 250/432 PD

OTHER PUBLICATIONS

Tanase, M., "Separation of $^{99m}$Tc from Neutron-Irradiated $MoO_3$ . . . ", J. Radioanal. Chem., 1977, 41(1) 23-27, (Jan. 1977).

Levi, H. W. et al., "Removal of $^{99}$Tc from $^{99}$Mo-containing Ammonium Molybdatophosphate", Chem. Abstracts 67: 112929z, (1967).

*Primary Examiner*—Deborah L. Kyle

*Attorney, Agent, or Firm*—Ladas & Parry

[57] ABSTRACT

A Technetium-99m generator has a matrix having a compound of molybdenum-99 bound into or forming the matrix, the compound of the molybdenum-99 being substantially insoluble in an eluant which can be used in a radiopharmaceutical and the molybdenum compound permitting diffusion of technetium-99m therethrough and elution therefrom. The molybdenum compound can be a monomolybdate, an isopolymolybdate or a heteropolymolybdate and zirconium molybdate is preferred although other cation molybdates may be used. Methods of preparation of the generator include dissolving irradiated molybdenum trioxide in alkaline solution and precipitating the molybdate at a selected pH and packing the precipitate in finely divided form into a column. Alternatively the generator may be formed from a non-radioactive, molybdenum compound and activated later when desired by passing a solution of a compound of molybdenum-99 through the column.

7 Claims, 1 Drawing Figure

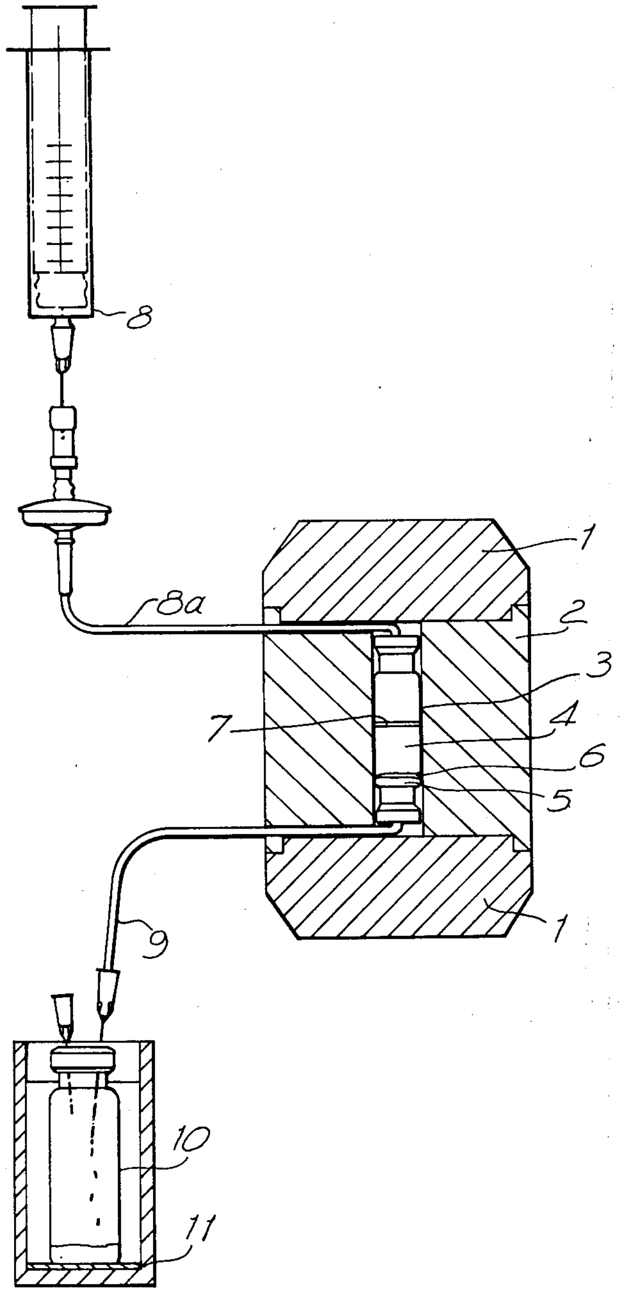
8
8a
1
2
3
7
4
6
5
1
9
10
11

TECHNETIUM-99M GENERATORS

FIELD OF THE INVENTION

The present invention concerns advances relating technetium generators for producing technetium suitable for medical and other uses.

Technetium-99 m is an important radionuclide used extensively in hospitals and other establishments. When formulated into various chemical compounds it is commonly used as a diagnostic radiopharmaceutical. However, technetium-99 m which decays into technetium-99, has a half life of only 6 hours and therefore for use in a medical clinic there must be a readily available source.

SUMMARY OF PRIOR ART

In practice, technetium-99 m is obtained as a decay product of its parent radionuclide molybdenum-99. This radionuclide has a half life of 67 hours and decays continuously to yield technetium-99 m. Several practical devices known as generators are commercially available which enable the user to separate the daughter radionuclide, technetium-99 m, from the parent radionuclide.

One such generator employs the technique of chromatographic separation. Molybdenum-99, in the form of a soluble molybdate, is adsorbed onto the surface of aluminium oxide arranged in a bed and the technetium-99 m which forms due to decay of the molybdenum-99 may be separated by elution. The elution step comprises passing a solution of physiological saline (0.9% NaCl) which is called the eluant, through the bed of the aluminium oxide. The molybdenum-99 remains on the bed, whilst the technetium-99 m enters the liquid phase (eluate) and issues at the exit point of the generator bed.

A properly constructed generator must satisfy qualitative and quantitative criteria which include:

(a) the eluate contains essentially only technetium-99 m and that there is no carry through of molybdenum-99

(b) the eluate is of an acceptable pharmaceutical quality and, (c) the separation efficiency (the ratio of the quantity of technetium-99 m obtained in the eluate to the quantity of technetium-99 m available) is maximised and remains at a high level through a succession of periodic elutions which conveniently take place at twenty-four hour intervals.

In commercially practicable generators having relatively high activity levels, for example greater than 200 millicuries, it has been found that secondary effects can substantially reduce the yield. It is thought that due to radiolysis the technetium reduces to chemical species which are not readily eluted, and that hydrated electrons may be a major cause of this reduction. This reduction of yield has been mitigated by the use of strong oxidising agents such as chlorine or chromate but with consequential significant disadvantages, or by the use of electron scavenging agents which are not strong oxidising agents, such as nitrate or nitrite ion (see Australian Patent Specification 45086/72).

Chromatographic technetium generators of the type referred to above have become the accepted practical form of generator for hospital use where a daily supply of technetium for radio-pharmaceutical purposes is required. Other methods are known to exist for producing technetium but are considered generally disadvantageous and therefore are less widely used. These other methods include the solvent extraction generator and the sublimation generator. Although these two alternative processes have specific advantages, the disadvantages are sufficiently great for the chromatographic generator to prevail. The solvent extraction generator is inconvenient in use and requires skilled personnel to carry out the relatively complicated operations. The sublimation generator has the disadvantage of a low separation efficiency and the arrangement is quite unsuitable for relatively small scale operations.

The chromatographic generator has therefore become the preferred form of generator especially for use in hospitals, but has the disadvantage when using only low specific activity (n,$\gamma$) molybdenum-99 of only providing a low activity generator. Consequently, it is normal to use carrier-free fission-produced molybdenum-99; there are inherent disadvantages in doing this in view of the high capital cost of processing plant, elaborate precautions required to prevent contamination, a waste disposal problem of other fission products and a high cost for the technetium produced.

SUMMARY OF THE INVENTION

The present invention provides a different approach to the production of technetium-99 m which can offer advantages over the prior art.

According to the present invention there is provided a generator for technetium-99 m comprising a container including a matrix in which technetium-99 m is produced, the matrix comprising a polymolybdate compound of molybdenum-99 gel-like structure which is substantially non-elutable in an eluant which may be used in a radiopharmaceutical, the matrix permitting diffusion of technetium-99 m therethrough by the eluant and elution therefrom.

Generators embodying the present invention are just as convenient and simple to operate as a chromatographic type generator and relatively unskilled personnel can be entrusted with the generator without particularly stringent precautions.

In the prior art chromatographic type generators, molybdenum in the form of molybdate has been adsorbed onto the surface of an alumina column whereas by contrast in the present arrangement a greater concentration of molybdenum can be provided in an effective form with the compound of molybdate in the matrix.

Zirconium molybdate is a highly suitable compound since it has a high degree of insolubility in the eluant and allows a high rate of diffusion of technetium-99 m out of the matrix.

Particularly where generators are prepared from high specific activity molybdenum, and this is the case for many commercially desirable arrangements, a substantial reduction in yield can occur due to radiolysis effects. One manner of dealing with this problem is to include in the eluant a substance which could be a strong oxidising agent (such as chromate) or materials such as nitrate or nitrite which have an electron scavenging effect and can assist in maintaining satisfactory yields.

However, one major improvement which can advantageously be included in embodiments of the invention is to incorporate into the matrix of the generator a solid oxidant which is reduced in preference to the pertechnetate ion, yet remains strongly bound into the matrix.

Although many compounds may be possible solid oxidants for the matrix, unacceptable levels of toxicity would exist with many compounds. One example of a compound suitable for use in embodiments of the invention is a compound of zirconium, in which the zirconium is wholly or partly replaced by cerium, the matrix having the oxidant in the form of cerium molybdate.

A gel-like material for use as the matrix, for example zirconium molybdate, can be prepared by precipitation from a solution of molybdate. It is thought that a high mobility of pertechnetate ion occurs and this provides favourable kinetics for release.

One good method for manufacturing the generator matrix will now be described in general terms.

Reactor irradiated molybdenum trioxide containing $^{99}Mo$ is dissolved in a slight excess of aqueous ammonia or sodium hydroxide solution. Acid is added to adjust the pH to between 1.5 and 7 and preferably in the range 2.5 to 5.5 and the resultant solution added to a stirred aqueous solution of zirconium in the form of zirconium nitrate or other suitable soluble salts such as zirconium chloride. Alternatively a salt of another suitable cation is used. A molybdate precipitate then occurs and the precipitate is removed by filtering or evaporation of the liquid, the resultant solid product being air dried and then sized for use in a generator.

The nature and manner of manufacture of a generator embodying the present invention may be varied considerably and there will now be described details of specific alternatives and the criteria to be considered in selecting any particular alternative.

ALTERNATIVE MOLYBDENUM COMPOUND PREPARATION METHODS

An alkaline dissolution method has been described above. An alternative subsequent procedure is to mix the solutions containing molybdate and zirconium salts or salts of other cations in strongly acidic solution. The molybdate is then precipitated by gradually increasing the pH of the solution by the addition of alkali.

CHOICE OF COMPOUNDS

Zirconium molybdate is a convenient and preferred compound for use in embodiments of the invention since it has a high degree of insolubility to the eluant and provides a high yield of technetium-99 m. Using similar techniques other compounds may be made and used, for example titanium molybdate, ceric molybdate, ferric molybdate, stannic molybdate, ammonium molybdosilicate, zirconium molybdosilicate, barium molybdate and any other molybdenum compounds which have a very low solubility to eluants which may be used for generators of the present type and which have suitable elution characteristics. With advantage mixtures of the above compounds may also be used.

FORM OF MOLYBDENUM COMPOUND

Preferably the molybdenum compounds for use in the present invention are in gel-like form although some degree of fine crystallinity may be observed in some compounds.

EFFECT OF pH

It has been found that the pH selected for the precipitation of the molybdenum compounds can have some effect on both the elution yield and purity when the compound is used in a generator. Tests have been conducted and comparative data obtained where the compound is produced from an ammonium molybdate solution. Where the pH of the molybdate solution was about 3 and the pH of the final suspension about 1.1 and elution was conducted for 5 days in sequence, the average elution efficiency was about 81%. If, however, the molybdate solution has a pH of 7 and the pH of the suspension is 2.8, the average elution efficiency has been found to be about 92% although the eluate impurity has increased from 0.02% to 0.35% molybdenum-99. It would seem that an approximate optimum value would be to have a molybdate solution of about pH 5 with a pH of the final suspension of about 1.5 giving an average elution efficiency of about 93% and an average eluate impurity of about 0.06%.

SOURCE OF MOLYBDENUM

A major advantage of the present invention is that a high activity generator can be prepared using (n, $\gamma$) produced molybdenum-99 although fission product $^{99}Mo$ could be used. However, the present invention permits yet another useful alternative to be adopted if desired. Zirconium molybdate in inactive form is prepared and in an isotope exchange operation, fission product molybdenum in solution is exchanged with the inactive molybdenum of the zirconium molybdate. This technique permits the generator to be manufactured without any safety precautions because the molybdate is in an inactive state. To make the column active, the procedure is simply to contact the generator column with a fission product molybdenum-99 solution. After about 1 hour, during which about 85% of the molybdenum-99 activity is transferred to the column, the column is rinsed with water.

In a particular case the activity of the column was 400 millicuries. A high average elution efficiency of 85% was found using normal saline solution as the eluant and the eluate had a good radionuclidic purity averaging 0.02% molybdenum-99.

CHOICE OF ELUANT

The present generators can be milked with water if desired, and saline solutions are not essential. Furthermore, other solutions such as sodium sulfate solutions could be used. By contrast prior art chromatographic generators cannot be eluted with water.

RADIOLYSIS EFFECTS

There is a possibility that elution efficiency of generators having a high activity may be seriously impaired due to radiolysis effects. However, a significant advantage is that such an effect has not been observed with zirconium molybdate and generators having activities of up to 1.6 curies have been prepared. Should the effect be observed it may be dealt with by incorporating oxidizing agents into the molybdate matrix (for example cerium manganese chromate or periodate) or alternatively oxidizing agents such as a chromate or nitrate or nitrite may be included in the eluant.

PURITY OF ELUATE

High radionuclidic purity may be achieved with generators of the present invention. To achieve very high standards, however, a small bed of alumina or zirconia or the like may be provided in series with the bed of molybdate so that radionucides other than the pertechnetate ion tend to be trapped on this additional bed.

It has been found in one example in which a generator has an 80–20 ratio of zirconium molybdate and cerium molybdate, the use of an alumina bed although reducing the elution efficiency from 86% to 82%, greatly increased the eluate purity by reducing the molybdenum-99 content from 0.15% to 0.003%.

For illustrative purposes only specific examples relating to the invention will now be given.

EXAMPLE 1

1. 4 g of $MoO_3$ was dissolved in excess of 3 M ammonium hydroxide solution which was then acidified to pH 4 by 5 M nitric acid solution.

2. The acidified solution was added slowly with constant stirring to a solution of zirconium nitrate containing 6.6 g of $ZrO(NO_3)_2$ and of pH approximately 1, thereby precipitating zirconium molybdate.

3. The zirconium molybdate precipitate was vacuum filtered on a Buchner funnel and air dried at about 55° C.

4. The precipitate was sieved and particles sized 150–500 μm were packed to form a column in a generator which will now be described with reference to the accompanying drawing:

BRIEF DESCRIPTION OF THE DRAWING:

The FIGURE shows a generator suitable for use with the present invention.

The generator comprises lead-shielding in the form of end caps 1 and a sleeve-like central portion 2 in the center of which a glass vessel 3 is provided and contains a bed of the gel-like matrix 4 which is located on sintered glass frit 6 which is mounted on a support 5. A retaining ring 7 is provided on top of the bed.

For the purpose of elution, a supply container 8 of eluant is disposed above the level of the bed, the eluant being passed slowly through a supply tube 8*a*, through the bed and through a discharge tube 9 into a receiving vessel 10 disposed in its own lead shield 11. In this particular example the bed contained about 1.5 g of the material and had an initial activity of about 0.5 curie.

Three such generators were manufactured and were eluted 5 times at 24 hour intervals with normal saline solution. The elution efficiency over the three generators over the 5 days varied between 79% and 90%, the average being 85%. This is considered to be a very acceptable commercial performance.

EXAMPLE 2

1. 4 g of $MoO_3$ was dissolved in an excess of ammonium hydroxide.

2. The solution was evaporated to dryness and the solid redissolved in water to form ammonium molybdate solution of pH about 5.5.

3. This solution was added to zirconium nitrate solution of pH about 1.0 precipitate zirconium molybdate which was filtered and then treated in accordance with Example 1 above. In this case the initial activity of the column was approximately 1 curie and a fairly consistant elution efficiency over 6 days averaging about 83% was achieved.

EXAMPLE 3

Using the procedure of Example 2, a mixed zirconium molybdate/cerium molybdate was produced having a molar ratio of 80–20 of zirconium to cerium. In this case the precipitation step was varied by adjusting the pH of the ammonium molybdate solution 3.5 before addition of the mixed cation solution. The pH of the suspension was then adjusted to 3.0.

Elution of the generators manufactured from the compound elution efficiencies of 90% and average molybdenum solubilities of 0.04% over 6 days. Elution of a pure zirconium molybdate gel, which was prepared in a similar manner, gave average elution efficiency of 85% and average molybdenum solubility of 0.17% over the same period.

We claim:

1. A generator for technetium-99 m comprising a container including a matrix in which technetium-99 m is produced, the matrix comprising a polymolybdate compound other than a heteropolymolybdate compound, said polymolybdate compound being of molybdenum containing molybdenum-99, being of gel-like structure and being substantially non-elutable in an eluant which may be used in a radiopharmaceutical, the matrix permitting diffusion of technetium-99 m therethrough and elution therefrom by said eluant.

2. A generator for technetium-99 m comprising a container including a matrix in which technetium-99 m is produced, the matrix being a compound of molybdenum containing molybdenum-99 selected from the group consisting of zirconium molybdate, titanium molybdate, ceric molybdate, ferric molybdate, stannic molybdate and mixtures thereof, said molybdenum compound being substantially non-elutable in an eluant which may be used in a radiopharmaceutical and the matrix permitting diffusion of technetium-99 m therethrough and elution therefrom.

3. A generator as claimed in claim 2, wherein the matrix is supported in the container on a porous inert bed and adapted to be eluted with a liquid selected from physiological saline solution, other salt solutions, and water.

4. A generator as claimed in claim 2 and including a solid oxidant in the matrix and having a substantially greater preference for reduction than $TcO_4^-$, and being strongly bound into the matrix.

5. A generator as claimed in claim 2, wherein the matrix comprises zirconium molybdate and cerium molybdate in molar ratio of approximately 4:1.

6. A generator as claimed in claim 2, wherein said molybdenum compound is a compound produced by precipitation caused by adjusting the pH of a solution.

7. A generator for technetium-99 m comprising a container including a matrix in which technetium-99 m is produced, and means to permit elution of the matrix with an eluant which may be used in a radiopharmaceutical, the matrix comprising zirconium molybdate in gel-like form and including molybdenum-99.

* * * * *